United States Patent
Chabot et al.

(10) Patent No.: US 8,943,363 B2
(45) Date of Patent: Jan. 27, 2015

(54) METHOD OF FAST REINITIALIZATION FOR INSTRUMENT PANEL VIEWING DEVICE

(71) Applicant: Thales, Neuilly sur Seine (FR)

(72) Inventors: Philippe Chabot, St Aubin de Medoc (FR); Florence Durieux, Pessac (FR); Marc Lefort, Merignac (FR); Gordon Sanderson, Bordeaux (FR)

(73) Assignee: Thales, Neuilly sur Seine (FR)

( * ) Notice: Subject to any disclaimer, the term of this patent is extended or adjusted under 35 U.S.C. 154(b) by 119 days.

(21) Appl. No.: 13/651,335

(22) Filed: Oct. 12, 2012

(65) Prior Publication Data
US 2013/0097461 A1    Apr. 18, 2013

(30) Foreign Application Priority Data
Oct. 14, 2011 (FR) ..................................... 11 03142

(51) Int. Cl.
| G06F 11/00 | (2006.01) |
| G01C 23/00 | (2006.01) |
| G06F 3/14 | (2006.01) |
| G06F 11/36 | (2006.01) |

(52) U.S. Cl.
CPC ...... G01C 23/00 (2013.01); G06F 3/14 (2013.01); G06F 11/3688 (2013.01); *G09G 2380/12* (2013.01)
USPC .............................................. 714/25; 714/46

(58) Field of Classification Search
USPC ...................................................... 714/25, 48
See application file for complete search history.

(56) References Cited

U.S. PATENT DOCUMENTS

| 5,937,366 | A | * | 8/1999 | Zbytniewski et al. ........ 702/108 |
| 6,584,587 | B1 | | 6/2003 | McDermott |
| 6,791,476 | B1 | | 9/2004 | Hedrick |
| 2001/0042229 | A1 | * | 11/2001 | James ............................. 714/48 |
| 2004/0158370 | A1 | * | 8/2004 | Le Draoullec et al. ......... 701/29 |
| 2006/0041776 | A1 | * | 2/2006 | Agrawal et al. ..................... 714/2 |
| 2006/0126608 | A1 | * | 6/2006 | Pereira et al. ................. 370/360 |
| 2008/0295090 | A1 | * | 11/2008 | Bestle et al. .................. 717/170 |
| 2010/0198431 | A1 | * | 8/2010 | Corbefin ........................... 701/3 |

OTHER PUBLICATIONS

David C. Matthews, et al., "NSEU impact on commercial avionics," XP031496403, 47th Annual International Reliability Physics Symposium, Montreal, pp. 181-193 (Apr. 26, 2009).
French Search Report for Counterpart French Patent Application No. 1103142, 8 pgs. (Jul. 2, 2012).

* cited by examiner

*Primary Examiner* — Sarai Butler
(74) *Attorney, Agent, or Firm* — Blakely, Sokoloff, Taylor & Zafman LLP

(57) ABSTRACT

The general field of the invention is that of the management of the faults of the viewing devices used on aircraft. An aircraft instrument panel viewing device comprises an electronic assembly, embedded software and a viewing screen. When the viewing device detects a fault arising after a predetermined time of proper operation, the reinitialization method according to the invention executes just the software verification tests without executing the electronic assembly verification tests termed "safety tests", no specific presentation of fault being displayed on the viewing screen. The duration for which the pilot is deprived of information is thus considerably reduced.

6 Claims, 6 Drawing Sheets

METHOD OF FAST REINITIALIZATION FOR INSTRUMENT PANEL VIEWING DEVICE

BACKGROUND OF THE INVENTION

1. Field of the Invention

The field of the invention is that of aircraft instrument panel viewing devices. The invention can however apply to other industrial fields comprising centralized control stations comprising an assembly of viewing devices and requiring fast reconfiguration in the event of a fault.

2. Description of the Prior Art

An aircraft viewing system demands great availability. This system comprises several viewing devices arranged on the instrument panel and various computers linked to the avionics system of the craft. This assembly is complex and manipulates thousands of aeronautical parameters. Moreover, it is programmed to reconfigure itself automatically or manually according to circumstances, thus adding to the complexity of the system.

Experience shows that the avionics system may be prone to errors causing the momentary loss of the information displayed on the viewing facilities and involving the application of complex procedures by the crew and significant extra work. Even if the probability of these faults is very low, less than $10^5$ per flight hour, the mean duration of this loss of information is of the order of 40 seconds, which, for an aircraft in flight, is a considerable duration.

Analysis of these faults shows that the great majority of these errors are due to failures of the software. Faults involving the hardware occur in more exceptional circumstances. Software faults reveal operational limits that were not discovered during the test phases, despite robustness tests.

To remedy these faults, the existing solutions consist in causing a fatal fault after detection of the irrecoverable error by the software.

For example, within the framework of the interface standardized according to the ARINC 653 aeronautical standard, this consists in declaring a "reset module" which causes the complete initialization of the hardware module and restarts a power-up test so as to ensure that the module can guarantee the integrity of the system. This procedure can take, as has been stated, up to forty seconds before the pilot regains an operational image on his viewing facility or facilities.

As has been seen, in most faults, the hardware is not at issue and this restart associated with a complete test of the system is not necessary.

SUMMARY OF THE INVENTION

The invention consists in putting in place a short restart of a viewing system, less than two seconds, thus limiting the impact of the loss of viewing in relation to the crew while affording the system the same degree of safety.

The method according to the invention reinitializes only the software part of the system so as to rapidly exit the defect detected and thus avoids the total restarting of the system. After this fast restart, if the defect is still present, a short restart is executed again, reinitialization being limited to three loops. After having confirmed the defect three times, the system is considered to be in a mode of confirmed fault.

More precisely, the subject of the invention is a method for reinitializing an aircraft instrument panel viewing device comprising an electronic assembly, embedded software and a viewing screen, characterized in that, when the viewing device detects a fault, the said fault arising after a predetermined time of proper operation of the viewing device, the viewing device executes just a software initialization without executing the electronic assembly verification tests termed "system safety test" or "safety tests", no specific presentation of fault being displayed on the viewing screen.

Advantageously, the origin of the fault is recorded in the means of storage of the viewing device.

Advantageously, when a second fault arises after a first fault before a predetermined time of proper operation of the viewing device, the viewing device executes the entirety of the software and electronic assembly verification tests, a specific presentation of fault being displayed during this verification.

Advantageously:

if, the "safety tests" having been run a first time, the result of the "safety tests" is not correct, the viewing device executes the "safety tests" a second time, if, on completion of this second execution, the result of the "safety tests" is not correct, the viewing device executes the "safety tests" a third time.

if, on completion of this third execution, the result of the "safety tests" is not correct, the viewing device is declared faulty, a specific presentation of fault being displayed on the viewing screen.

Advantageously, the software is produced according to the ARINC 653 standard.

BRIEF DESCRIPTION OF THE DRAWINGS

The invention will be better understood and other advantages will become apparent on reading the nonlimiting description which follows and by virtue of the appended figures among which.

DETAILED DESCRIPTION

Figure 1:
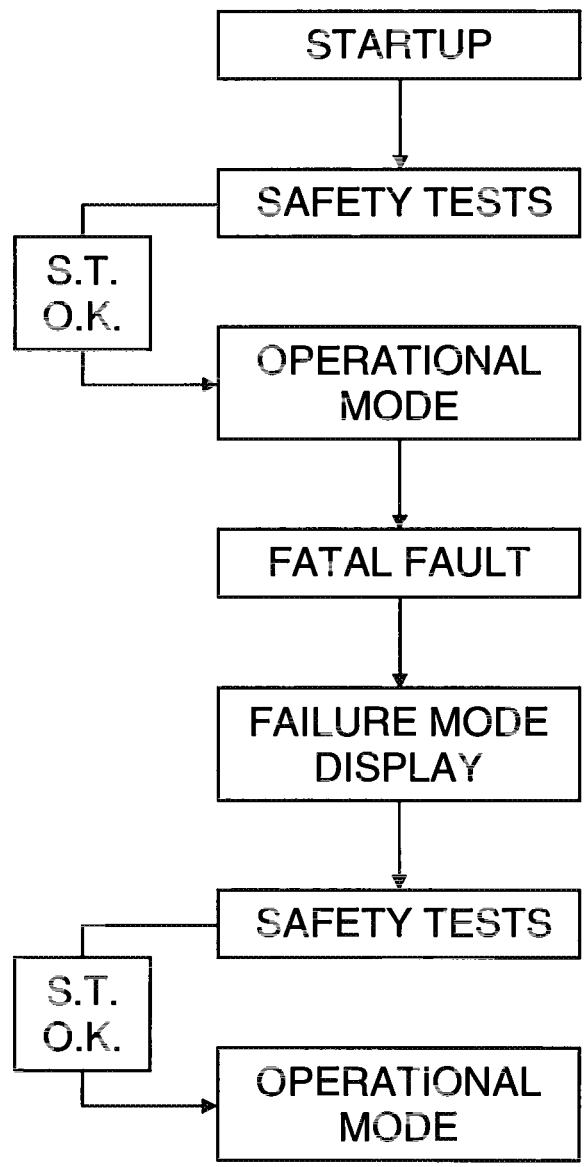
FIG. 1 represents the various steps of the method for reinitializing a viewing device according to the prior art.
Figure 2A:
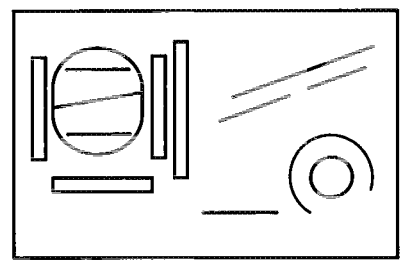
FIGS. 2a, 2b and 2c represent various display configurations representative of the proper and of the wrong operation of the viewing device.

FIG. 1 represents the various steps of the method for managing a viewing device according to the prior art. On startup of the viewing device, the software carries out all the equipment's hardware and software safety tests (Step: "SAFETY TESTS" of FIG. 1). If the safety tests are correct (Step: "S.T. O.K." of FIG. 1), the viewing device is operational and displays a graphical representation of the piloting or navigation parameters as may be seen in FIG. 2a.

Figure 2B:
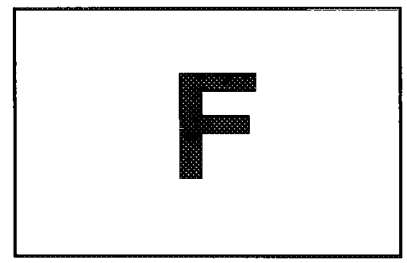
Figure 2C:

When a fault arises (Step: "FATAL FAULT" of FIG. 1), whatever its origin, the viewing device passes to "FAILURE MODE" and displays a symbol or "pattern" representing an uppercase F on a black background for a duration of about 10 seconds as seen in FIG. 2b, the software reinitializes the sequence of the "SAFETY TESTS", the display passes to "SAFETY TESTS" mode and, if the safety tests are correct, the viewing device regains a functional display. This reinitialization sequence lasts about forty seconds, during which the pilot is deprived of any display.

As has been stated, complete running of the safety tests is in most faults pointless in so far as the fault is usually caused by operational limits that are difficult to detect through conventional hardware verification tests and is not indicative of any serious malfunction of the hardware.

Figure 3:
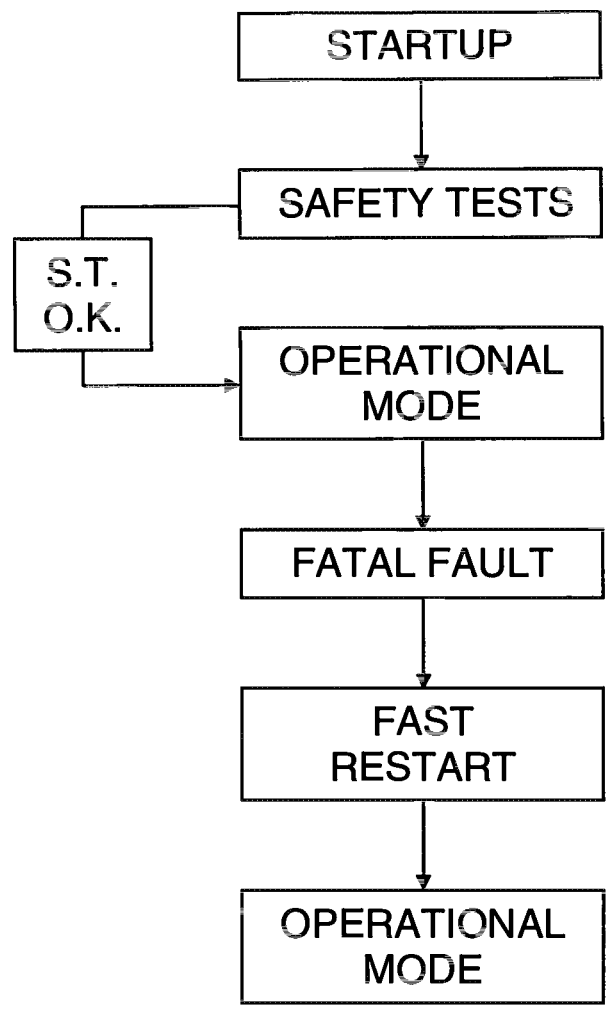
FIG. 3 represents the various steps of the method for reinitializing a viewing device according to the invention in the case of a single fault.

In the method according to the invention illustrated in FIG. 3, the state diagram of the operating modes of the software Platform (Operating System and basic software) is modified so as to introduce a condition into the processing of fault cases. Upon initial startup, the "SAFETY TESTS" are performed a first time as in the previous method.

When a fatal fault arises, on the first occurrence, the viewing module alone is reinitialized, without running the hardware safety tests. The loss of the operational image is then limited to two seconds, thus constituting noticeable progress with respect to the previous method. This mode is called "Short Reset".

This fault does not form part of the faults sent to the maintenance computer or "CMS", the acronym standing for "Centralized maintenance System". It is recorded in nonvolatile memory or NVM in an area of the memory denoted "Shop Data Area" of the viewing device. It will thus be possible for the origin of the fault to be analysed and corrected during the ground maintenance phases.

This reinitialization arrangement alone would be insufficient to ensure the same safety as the reinitialization method of the prior art. The system could filter the defect, but the risk would be of never confirming the fault, of not detecting hardware faults and of degrading the system's safety level, this being inconceivable in an avionics system.

Figure 4:
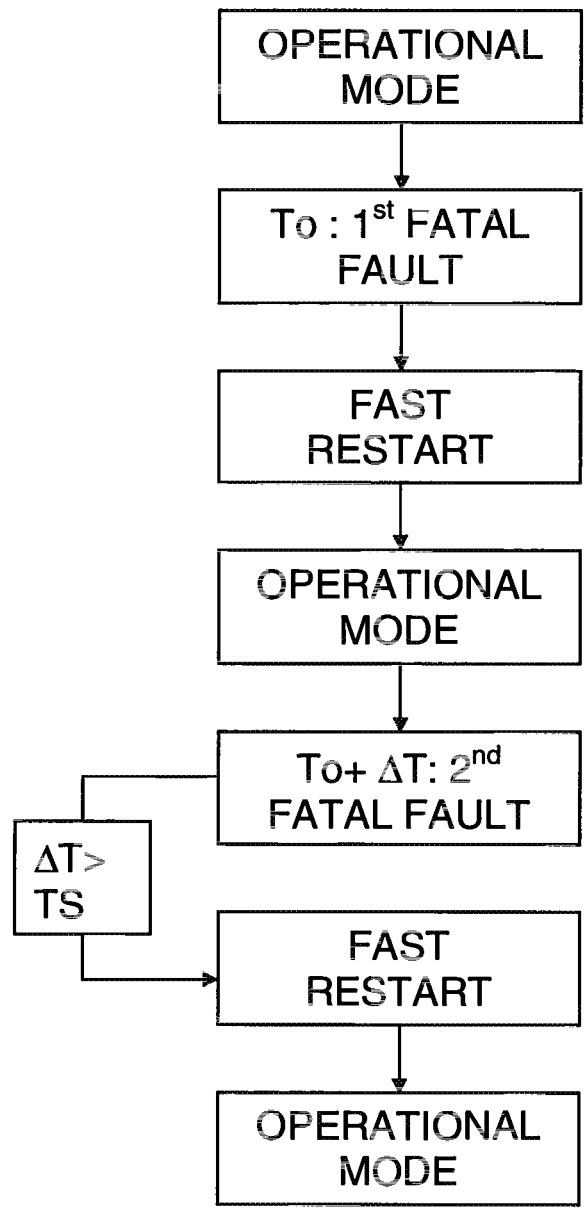
FIG. 4 represents the various steps of the method for reinitializing a viewing device according to the invention in the case of two successive faults separated by a duration which is greater than a predetermined duration.
Figure 5:
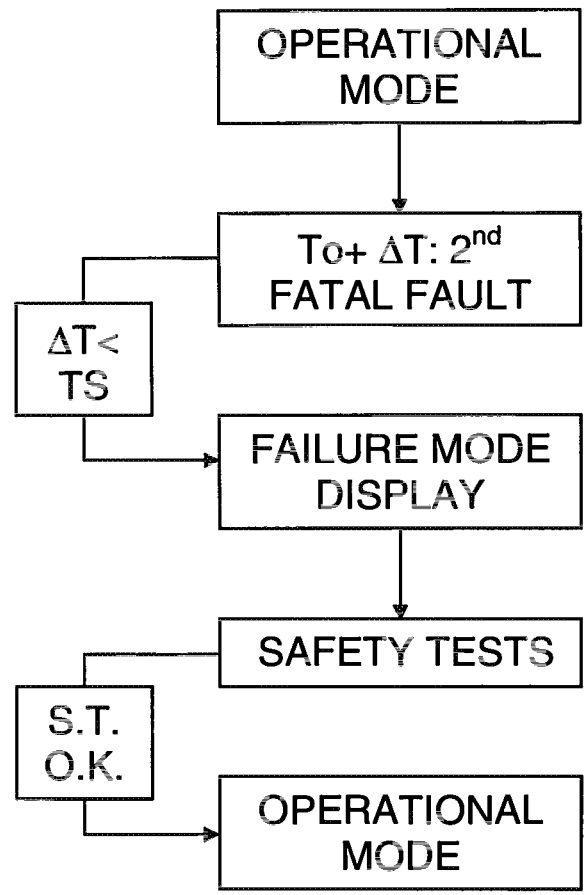
FIG. 5 represents the various steps of the method for reinitializing a viewing device according to the invention in the case of two faults separated by a duration which is less than a predetermined duration.

Hence, as illustrated in FIGS. 4 and 5, if a second fault occurs after a first fault, two typical cases arise. In a first case illustrated in FIG. 4, the second fault occurs beyond a predetermined duration TS, the fast restart, the "Short Reset" is enabled, the operational image is again available in under two seconds.

In a second case illustrated in FIG. 5, if the second fault occurs shy of the said predetermined duration TS, the fast restart is no longer enabled. The software platform reactivates the "FAILURE MODE" configured by the application. The pattern "F" is displayed for ten seconds, and then the Failure mode requests the Operational mode with an unconditional running of the "safety tests".

By way of example, the predetermined duration TS may be of the order of a minute. This duration may be configurable according to the avionics system.

This solution allows the system to reinitialize itself rapidly while affording the same safety level as previously. Indeed, if the fault is due to a fault of the hardware, it will recur rapidly and will lead the software to request the execution of the safety tests which will make it possible to confirm this hardware fault. If the fault is of software origin, undiscovered during the schedule of compliance tests, reinitialization will allow the software to regain a non-degraded environment. The software will continue its execution in a nominal manner and ensure an operational display during almost the entire flight.

Figure 6:
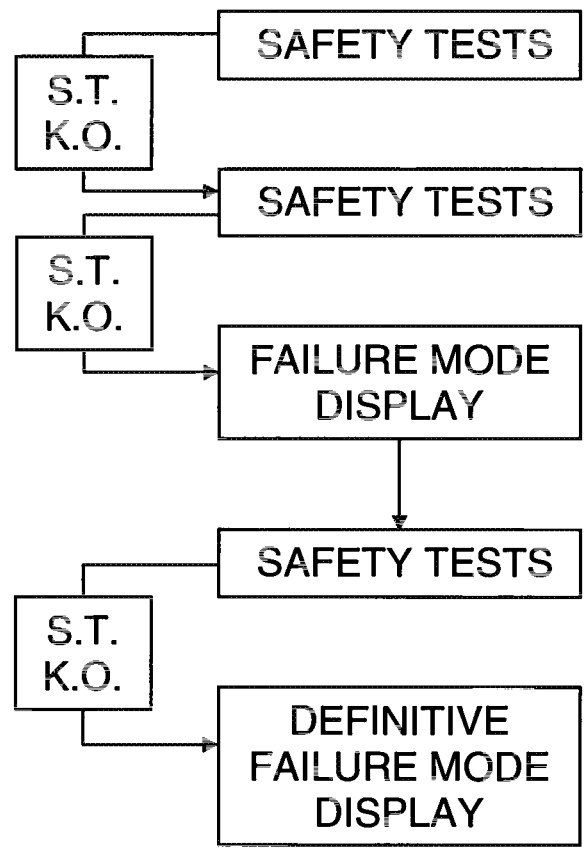
FIG. 6, finally, represents the various steps of the method for reinitializing a viewing device according to the invention in the case where the safety tests are negative.

In the foregoing, the safety tests are always run successfully, FIG. 6 illustrates the case where the result of the "safety tests" is not satisfactory, symbolized by the step "S.T. K.O." in this figure. in the case where the safety tests are not satisfactory a first time, they are executed a second time, and in the case where they are still not satisfactory, a third time. The third time round, the viewing device is declared faulty. The "Failure" mode is displayed definitively on the viewing screen.

The method according to the invention applies most particularly to avionics systems operating according to the ARINC 653 standard entitled "Avionics Application Software Interface".

What is claimed is:

1. A method for reinitializing an aircraft instrument panel viewing device comprising an electronic assembly, embedded software and a viewing screen, the method comprising:
   detecting a fault associated with the aircraft instrument panel viewing device during an operation mode of the aircraft instrument panel viewing device, wherein the fault is determined to arise after a predetermined time of proper operation in the operation mode of the aircraft instrument panel viewing device; and
   executing a verification test that resets and tests the embedded software that controls the aircraft instrument panel before execution of a different verification safety test that resets and tests the embedded software and the electronic assembly and clears a display of the viewing screen during the safety test, wherein no specific presentation of fault is displayed on the viewing screen during execution of the verification test.

2. The method for reinitializing the aircraft instrument panel viewing device according to claim 1, wherein the origin of the fault is recorded in the means of storage of the viewing device.

3. The method for reinitializing the aircraft instrument panel viewing device according to claim 1, wherein when a second fault arises after a first fault before a predetermined time of proper operation of the viewing device, the viewing device executes the entirety of the software and electronic assembly verification tests, a specific presentation of fault being displayed during this verification.

4. The method for reinitializing the aircraft instrument panel viewing device according to claim 1, wherein
   if, the safety tests having been run a first time after failure of the verification test of the embedded software that controls the aircraft instrument panel, the result of the safety tests is not correct, the viewing device executes the safety tests a second time,
   if, on completion of this second execution, the result of the safety tests is not correct, the viewing device executes the safety tests a third time,
   if, on completion of this third execution, the result of the safety tests is not correct, the viewing device is declared faulty, a specific presentation of fault being displayed on the viewing screen.

5. The method for reinitializing the aircraft instrument panel viewing device according to claim 1, wherein the software is produced according to the ARINC 653 standard.

6. A system, comprising:
   an aircraft instrument panel viewing device that comprises an electronic assembly, embedded software, and a viewing screen;
   a processor coupled with the aircraft instrument panel viewing device to
      detect a fault associated with the aircraft instrument panel viewing device during an operation mode of the aircraft instrument panel viewing device, wherein the fault is determined to arise after a predetermined time of proper operation in the operation mode of the aircraft instrument panel viewing device, and execute a verification test that resets and tests the embedded software that controls the aircraft instrument panel before execution of a different verification safety test that resets and tests the embedded software and the electronic assembly and clears a display of the viewing screen during the safety test, wherein no specific presentation of fault is displayed on the viewing screen during execution of the verification test.

\* \* \* \* \*